Nov. 16, 1965  E. F. MEKELBURG  3,218,427
SANITARY COVER FOR SELECTOR SWITCH
Filed May 20, 1963
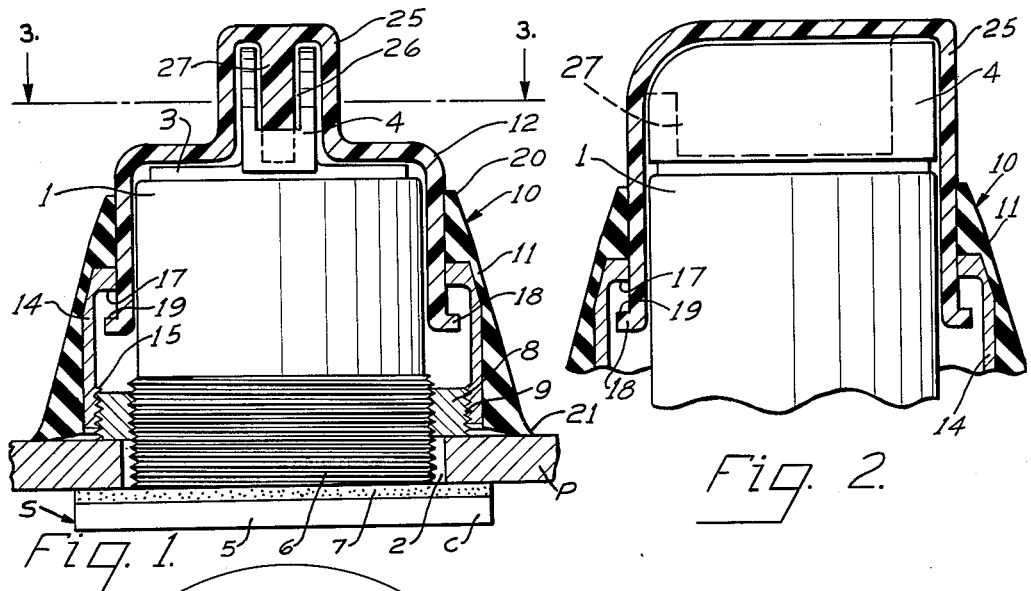
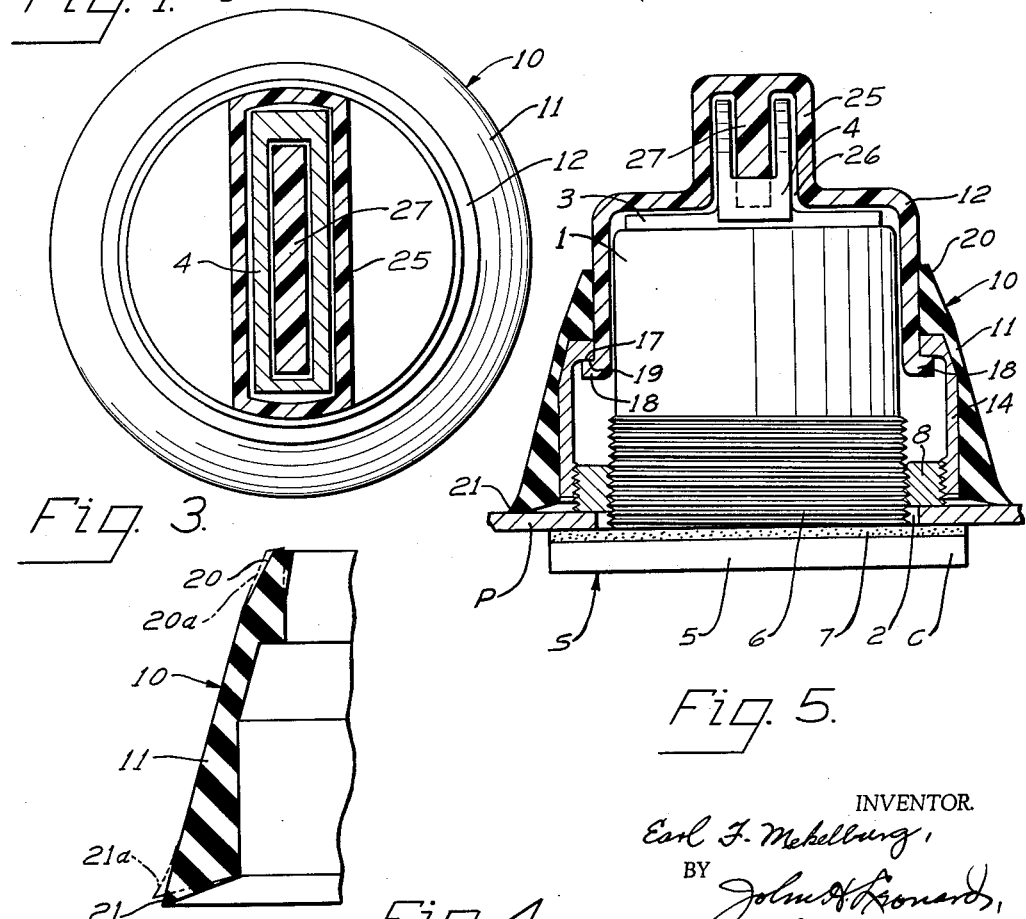
INVENTOR.
Earl F. Mekelburg,
BY John H. Leonard,
his ATTORNEY.

United States Patent Office 3,218,427
Patented Nov. 16, 1965

3,218,427
SANITARY COVER FOR SELECTOR SWITCH
Earl F. Mekelburg, Wauwatosa, Wis., assignor to Square D Company, Park Ridge, Ill., a corporation of Michigan
Filed May 20, 1963, Ser. No. 281,534
5 Claims. (Cl. 200—168)

This invention relates to a sanitary cover for selector switches, and to the combination of the sanitary cover with the switch, and particularly with the rotary actuator assembly of the switch.

Electric selector switches are commonly used in equipment for processing foods, biologicals, and the like, wherein the switch is exposed on the forward face, or the top face, of a panel of the equipment. The equipment and switch must be kept free of accumulations of contaminants. The removal of contaminants, however, requires that the equipment, including the panel on which the switch is installed, be washed with detergents and live steam frequently. Consequently the portion of the switch exposed at the forward or outer face of the panel, would have to be subjected to hot water, detergents, and live steam in the normal course of cleaning the equipment unless the switch were shielded in some manner.

It is desirable, therefore, to prevent contaminants from reaching the switch so that the switch will not have to be cleaned and, at the same time, to prevent the cleaning media applied to the associated equipment and forward face of the panel from reaching the switch. For these purposes, the the sanitary cover of the present invention is provided.

The cover is such that it can prevent contaminants, water, live steam, and other media from entering into the cover through the cover itself, and between it and the panel face when the cover is installed, while permitting operation of the switch in the conventional manner while the cover is in place, thus isolating the switch from both contaminants and cleaning media.

A principal object of the invention is to provide a suitable sanitary cover which, when installed in proper relation with respect to the switch mechanism on a panel, provides a seal between the forward face of the panel and an isolating cover for the portion of the switch exposed at the forward face of the panel.

The cover includes a cap which is supported by the remainder of the cover for rotation and endwise movement relative thereto while providing an effective seal for preventing the entrance of contaminants and steam between the cap and remainder of the cover while, at the same time, affording ready rotation of the cap for operating the switch.

A further advantage of the present invention is that the cover can readily be mounted on panels of different thicknesses without any change in the switch and cover structure, and without special adjustments thereof.

Various other objects and advantages will become apparent from the following description, wherein reference is made to the drawings, in which:

FIG. 1 is a front elevation, partly in section, showing a switch and cover assembly of the present invention installed on a panel;

FIG. 2 is a fragmentary right end elevation, partly in section, of the structure illustrated in FIG. 1;

FIG. 3 is a horizontal sectional view taken on the line 3—3 in FIG. 1;

FIG. 4 is an enlarged fragmentary vertical sectional view of a portion of the cover of the present invention, showing sealing portions thereof in sealing and released condition; and FIG. 5 is a view similar to FIG. 1 showing a different operating position of the cap of the present invention relative to the rotary actuator of the switch.

Referring to the drawings, the invention is shown for purposes of illustration, in combination with a switch S mounted on a horizontal supporting panel P, with the finger grip of the switch, for turning it to selected positions, exposed for access from above, the installation of the switch on upright or inclined panels being clear from the illustrative example. For brevity in description, the face of the panel at which the finger grip of the switch is exposed is referred to hereinafter as the "forward" face.

The switch S may be of a conventional type. It is provided with a forwardly extending body 1 which is arranged to be inserted through an aperture or opening 2 in the panel P from the rear of the panel and to extend forwardly beyond the forward face of the panel. Rotatably mounted within the body 1 is a rotary switch actuator 3 which is drivingly connected to the movable contact, not shown, of the switch S so as to set the switch in different selected positions consequent upon rotation of the actuator 3 about its rotational axis. At its forward end, the actuator 3 is provided with a finger grip 4 which may be grasped in the conventional manner for rotating the actuator 3 about its axis for operating the switch. In the form illustrated, the body 1 is detachably connected to a casing portion C containing the contacts of the switch, but it may be integral therewith.

For mounting the switch S, including its actuator, on the panel P, the body 1 is provided at the rear end with a flange portion 5 to which the switch casing C is bolted. The body 1 has a threaded portion 6 which extends from adjacent the flange forwardly and through the aperture or opening 2 of the panel. The threaded portion is of sufficient length to extend a substantial distance forwardly from the forward face of the panel.

A suitable gasket 7 may be interposed between the rear face of the panel and the forward face of the flange 5 for assuring that the switch can be drawn firmly into installed position on the panel.

In order to secure the switch S to the panel P, a suitable ring nut 8 having internal threads in threaded engagement with the threaded portion 6, is provided. By rotation of the nut 8, the margin of the panel about the opening 2 can be clamped between the rear end of the ring nut 8 and the forward face of the flange portion 5. The nut 8 is externally threaded as indicated at 9.

A sanitary cover 10 embodying the features of the present invention is adapted to overlie and engage the forward face of the panel P and to fully enclose all of the switch mechanism exposed at the forward face of the panel which mechanism, in the illustrative form, is the body 1 and switch actuator 3.

The cover 10 comprises a shield 11 and a cap 12. The shield 11 is preferably an annular, frusto-conical shell, and is arranged so that, when installed, its rear end is disposed in sealing relation to the panel P and its front end resiliently embraces the peripheral wall of the cap 12 in sealing relation thereto while permitting rotation of the cap relative to the shield about their common axis and movement of the cap axially relative to the shield to axially adjusted positions.

For attaching the cover to the switch so that the cover is in proper sealing relation to the forward face of the panel and the shield is in proper sealing relation to the cap, the shield is provided with an internal thread. This may be provided by bonding into the shield a connecting element, shown as a ring nut 14. The nut 14 is preferably secured in fixed axial relation to the shield, and is rotatable therewith. The ring nut 14 is internally threaded, as indicated at 15, for cooperation with the threaded portion 9 of the ring nut 8. Thus by grasping the shield 11 and rotating it for cooperating the nut 14 with the portion 9, the rear end of the shield can be drawn firmly against the forward face of the panel. The ring nut 14 has an annular seat 17 which is disposed near the forward end of the shield and faces rearwardly. The cap 12 has an external peripheral flange 18 at its open end providing a sealing surface 19 facing toward, and adapted to seat against, the surface 17, thus constraining the cap from removal forwardly out of the shield. The cap has a diameter such that it can readily be inserted, closed end foremost, in the shield from the rear end of the shield.

In order to provide an effective seal between the cap and the shield, the outer annular end portion of the shield, indicated at 20, is in the form of coaxial, radially aligned internal and external annular walls which converge toward each other and toward the axis of the shield in a direction forwardly. They define an opening coaxial with, but of smaller diameter than, the outer periphery of the cap. Thus when the cap is pushed through the shield, closed end foremost, from the rear, the portion 20 of the shield is resiliently expanded, as indicated by the dotted line 20a, and resiliently embraces the outer peripheral wall of the cap in sealing relation while permitting rotation of the cap relative to the shield and movement of the cap rearwardly axially of the shield toward the panel.

Correspondingly, at the rear end of the shield, the outer wall and inner end wall of the shield converge at an acute angle to each other in a direction rearwardly toward the panel, and thus provide an edge 21 which, when the shield is drawn firmly toward the panel, is resiliently flexed, as illustrated by the dotted line 21a in FIG. 4, into contact with the forward wall of the panel and provides a firm and effective seal with the forward face of the panel.

As mentioned, it is desirable that the actuator 3 be rotatable by rotation of the cap 12. For this purpose, the cap member has a hollow finger grip portion 25 aligned with, and telescopically accommodating the finger grip portion 4 of the actuator 3 and thus drivingly connecting the cap and actuator for rotation of the actuator by rotation of the cap. Either the cap or actuator may be provided with a socket and the other of the two provided with a tongue which is received in the socket and is movable therein axially of the cover when the cap cover is assembled on the installed switch.

In the form illustrated, a socket 26 is provided in the finger grip 4 of the actuator and a tongue 27 is provided on the inside of the hollow finger grip portion 25 of the cap. The depth of the socket 26 axially of the cap and shield and the length of the tongue 27 axially of the cap and shield, are such that they can engage and drivingly interconnect the cap and actuator 3. Also, the tongue can be used to operate an actuator which does not have a finger grip but only a forwardly open socket.

As mentioned hereinbefore, the cap 12 is movable axially relative to the cover 11 while sealing engagement is maintained between them by the portion 20.

This provision for axial movement while maintaining a seal and driving connection is because, in the type of switch illustrated, the distance at which the finger grip 4 is disposed forwardly of the panel is affected by the thickness of the panel. For example, in FIG. 1, a relatively thick panel is shown. In this case, the finger grip 4 is disposed forwardly of the panel for a distance such that, when the tongue 27 is seated near the bottom of the socket 26 and the finger grip 4 is in the finger grip 25, the cover 11 is positioned axially relative to the cap 12 so that the portion 20 is near the plane of the closed end of the cap and the seat 17 and sealing surface 19 are spaced from each other axially.

However, as illustrated in FIG. 5, if a thinner panel is used, the finger grip 4 of the actuator 3 is disposed farther forward from the forward face of the panel than in FIGS. 1 through 4. This distance may be such that, when the tongue 27 is fully seated in the bottom of the socket 6, the cap is disposed axially outwardly so that the portion 20 of the cover is spaced a considerable distance rearwardly from the closed end of the cap and the seat 17 and sealing surface 19 are in engagement. This latter engagement limits the movement of the cap 12 relative to the cover 11.

Thus the sliding connection between the cap and the shield, together with the hollow finger grip 25 and tongue 27, permit an automatic adjustment for a thickness of panel as the switch and cover mechanism are installed.

The cap does not have to slide axially in the shield once the installation has been made, hence wear and any tendency for the seal between the external peripheral wall of the cap 12 and the portion 20 of the shield 11 to become broken is reduced to a minimum. The only relative motion between the cap and shield after installation is the rotary motion between the outer peripheral wall of the cap 12 and the portion 20 of the shield 11 in engagement therewith. Due to the resiliency and self-restoring quality of the shield, it can embrace the peripheral wall of the cap so firmly so as to prevent leakage even when subjected to a cleaning jet of live steam.

Various materials can be used provided they can maintain their shape and resiliency when subjected to live steam. The threaded portions, preferably, are metal. The shield is preferably black neoprene, and is bonded to the metal ring nut 14. It may, for example, be of 60 durometer hardness, ASTM specification, SC620, E–1, E–3 and F–1. The cap, on the other hand, may be of synthetic resin, such as polypropylene. These materials meet the requirements effectively.

It is apparent in the present structure, all that is necessary to install the switch and cover on a panel, is to insert the body 1 through the opening 2 in the panel P, forcing it forwardly until the flange 5, with the gasket 7, bears against the rear of the panel. In this position, the ring nut 8 is tightened, thus firmly securing the switch in place with the body 1 and actuator 3 disposed forwardly of the front face of the panel. Next the cap 12 is inserted closed end foremost into the shield 11 from the rear and the tongue 27 aligned properly with the socket, or, if desired, the cap is pressed onto the actuator until the tongue is seated fully in the socket. The cover is then screwed onto the nut 8 until its rear edge is in firm, sealing engagement with the front face of the panel, the cap and shield automatically adjusting themselves axially for proper fitting of the tongue in the socket regardless of difference in thicknesses in the panel.

Having thus described my invention, I claim:

1. An actuator assembly and a sanitary cover combination for a selector switch and comprising a body having a front end, said body being adapted to be mounted on a panel and extend in a direction forwardly and rearwardly thereof with the front end disposed forwardly of the panel, threaded means carried by the body, a rotary switch actuator member rotatably supported by the body and exposed for access at the front end of the body, a protective shield of annular cross section and having an internal thread in coaxial relation thereto and rotatable therewith, and complementary to said threaded means for detachably, threadably connecting the shield to said threaded means in coaxial relation to the actuator member, said shield having a portion of elastomeric material extending axially in a direction forwardly and rearwardly of the body beyond the ends of said internal thread, a protective cap member mounted in, and in coaxial relation with, the shield, said cap member having a closed end and being open at the other end and having its open end within said shield, said cap member being rotatable about its axis relative to the shield and being slidable endwise of its axis relative to the shield in a direction forwardly and rearwardly of the body, said cap member having its closed end disposed forwardly of the shield and having at its open end a seating surface facing toward its closed end, said shield having an internal complementary seating surface for engaging the seating surface of the cap member for constraining the cap member from removal endwise, closed end foremost, out of the shield, the portion of said elastomeric portion which is forwardly of the internal thread being in resilient sliding sealing relation to the side wall of the cap member, a finger grip on the forward portion of the cap member for rotating the cap member about its axis, and interengaged connector means on the actuator member and cap member connecting the members and constraining them for co-rotation upon rotation of the cap member.

2. The structure according to claim 1 wherein the shield has a sealing portion at its rear end in the form of a resilient peripheral flange adapted for sealing engagement with said forward face of the panel when the actuator member and shield are installed on a panel.

3. The structure according to claim 1 wherein said interengaging means comprise a socket means in one of the members and a tongue means on the other of the members receivable in the socket means endwise of the members during assembly of the actuator member and sanitary cover.

4. The structure according to claim 3 wherein, in a direction axially of the shield, the socket and tongue are relatively movable axially of the members and the extent of their interengaging surfaces in the direction of movement are long enough to remain in operative interengagement in a plurality of different relative axial positions of the members, whereby the combination can be adjusted to panels of different thicknesses during installation thereof.

5. The structure according to claim 3 wherein the finger grip has a cavity therein which is open rearwardly of the cap member and said cavity provides the socket which receives a tongue on the actuator member endwise and accommodates the tongue for co-rotation with the finger grip, said finger grip has a rearwardly extending tongue within its cavity, and the tongue on the actuator member has a forwardly open cavity which receives the tongue in the finger grip endwise and accommodates the tongue in the finger grip for co-rotation with the actuator member.

References Cited by the Examiner

UNITED STATES PATENTS

| | | | |
|---|---|---|---|
| 2,040,919 | 5/1936 | Caldwell | 200—172 |
| 2,748,208 | 5/1956 | Koertge | 200—168 |
| 2,795,144 | 6/1957 | Morse | 200—168 |
| 2,984,726 | 5/1961 | Roeser | 200—172 |

BERNARD A. GILHEANY, *Primary Examiner.*